United States Patent [19]

Okuyama

[11] Patent Number: 5,136,285
[45] Date of Patent: Aug. 4, 1992

[54] PORTABLE DATA TRANSMITTING/RECEIVING APPARATUS

[75] Inventor: Toshiharu Okuyama, Tokyo, Japan

[73] Assignee: Man Design Co., Ltd., Tokyo, Japan

[21] Appl. No.: 693,040

[22] Filed: Apr. 30, 1991

Related U.S. Application Data

[63] Continuation of Ser. No. 352,363, May 16, 1989, abandoned.

[30] Foreign Application Priority Data

May 20, 1988 [JP] Japan .................................. 63-122021

[51] Int. Cl.⁵ ...................... G08C 17/00; G08C 19/12
[52] U.S. Cl. ...................... 340/870.110; 340/870.28; 340/825.06; 340/825.07; 340/825.52; 340/825.69; 340/825.72; 340/539; 364/550
[58] Field of Search ...................... 340/870.02, 870.03, 340/870.11, 870.15, 870.18, 521, 539, 711, 825.06, 825.07, 825.52, 825.54, 825.69, 825.72; 364/474, 550, 552-564

[56] References Cited

U.S. PATENT DOCUMENTS

| | | | |
|---|---|---|---|
| 4,031,513 | 6/1977 | Simciak | 340/870.03 |
| 4,334,221 | 6/1982 | Rosenhagen et al. | 340/825.69 |
| 4,586,150 | 4/1986 | Budziak et al. | 33/1 PT |
| 4,654,662 | 3/1987 | Van Orspel | 340/870.03 |
| 4,677,429 | 6/1987 | Glotzbach | 340/711 |
| 4,677,755 | 7/1987 | Iwano et al. | 33/504 |
| 4,736,313 | 4/1988 | Nishimura et al. | 33/1 L |
| 4,868,893 | 9/1989 | Hammond | 340/870.02 |
| 4,973,957 | 11/1990 | Shimizu et al. | 340/825.52 |
| 5,008,661 | 4/1991 | Raj | 340/825.69 |

FOREIGN PATENT DOCUMENTS

61-209309 9/1986 Japan .

*Primary Examiner*—Donald J. Yusko
*Assistant Examiner*—Michael Horabik
*Attorney, Agent, or Firm*—Nixon & Vanderhye

[57] ABSTRACT

A receiver receives measurement data output as a radio wave from a measuring unit for measuring a physical or chemical value of an object to be measured together with a data type (ID data) for identifying the measuring unit. The measurement data and the data type received by the receiver are displayed on a display unit for a predetermined period of time and is stored in a data memory. It is confirmed whether the measurement data and the data type are properly stored, by comparing the displayed data on a display portion of the measuring unit with the displayed data on the display unit. When a cancel key of a keyboard is operated, latest measurement data and a latest data type which are stored last in the data memory are cleared. Measurement data obtained by the measuring unit and input through the keyboard and a data type assigned to the measuring unit are displayed on the display unit for a predetermined period of time and are stored in the data memory. When a tranmission key of the keyboard is operated, all the measurement data stored in the data memory is output from a transmitter to an external data processing unit together with data type by radio transmission.

6 Claims, 8 Drawing Sheets

PORTABLE DATA TRANSMITTING/RECEIVING APPARATUS

This is a continuation of application Ser. No. 07/352,363, filed May 16, 1989, now abandoned.

BACKGROUND OF THE INVENTION

1. Field of the Invention

The present invention relates to a portable data transmitting/receiving apparatus for receiving digital data sequentially output from each measuring unit, temporarily accumulating the data in a data memory, and collectively transmitting the accumulated data to an external data processing unit such as a host computer.

2. Description of the Related Art

Various types of product inspection are performed in an inspection process of products in, e.g., a factory. When product inspection for mass production is to be performed, a plurality of types of measuring units are normally arranged along a production inspection line. Objects to be measured (products) flowing on the production inspection line are measured (inspected) by the respective measuring units, and the measurement results are totaled to calculate the quality levels and yield of the products.

According to a known measurement data processing apparatus designed to increase operation efficiency of such product inspection, a circuit for extracting a measurement value as an electrical signal is incorporated in each portable physical or chemical value measuring unit such as a vernier caliper, a dial gauge, and a micrometer. When an operator of each measuring unit depresses a transmission button attached to the measuring unit, measurement data is transmitted to a data input unit through a cable. The data input unit accumulates measurement data sequentially transmitted from each measuring unit in a data memory in a storage section. When the remaining storage capacity of the storage section decreases below a limit value, all the measurement data stored in the data input unit is supplied to a data processing unit such as a host computer installed in a management room or the like through an I/0 unit. The data processing unit calculates the quality levels or yield of the products by using the collectively input measurement data, and displays the calculation result on a CRT display section or prints it out through a printer.

In such a measuring system, however, the respective measuring units and the data input unit are connected to each other through cables. If a cable for extracting measurement data is attached to each measuring unit, it interferes with the operation of the measuring unit operator, and measurement operation efficiency is decreased.

In order to eliminate such a drawback, a portable measuring unit incorporating a circuit for extracting a measurement value as an electrical signal and a very small transmitter for outputting measurement data extracted by the circuit as a radio wave has been developed, as disclosed in U.S. patent application Ser. No. 348,170, filed on May 2, 1989 and now U.S. Pat. No. 4,973,957 issued on Nov. 27, 1990 which is a continuation-in-part of application Ser. No. 111,671 filed by Shimizu et al. including an inventor, Okuyama, of the present invention on Oct. 23, 1987, now abandoned, (West Germany Patent Application No. P3736901.6 filed by the present applicant on Oct. 30, 1987). According to this measurement data processing apparatus, an antenna and a receiver are incorporated in a data input unit, so that when a transmission button of each measuring unit is depressed, measurement data is transmitted to the data input unit as a radio wave.

In such an apparatus, however, in order to allow an operator of each measuring unit to confirm that measurement data is reliably transmitted to the data input unit, a small receiver called an answer back unit for receiving a normal response (ACK) signal must be arranged near the operator independently of the measuring unit in addition to a transmitter incorporated in the data input unit. When the operator depresses a transmission button of a given measuring unit, measurement data is, e.g., FSK-modulated and output as a radio wave, and is received by the data input unit. Upon normal reception of the measurement data, the data input unit outputs the ACK signal as a radio wave to the answer back unit through the transmitter. Upon reception of the ACK signal, the receiver signals it to the operator by, e.g., turning on a display lamp for a predetermined period of time.

In addition, the data input unit sequentially stores measurement data sequentially supplied from the respective measuring units in an external storage unit such as a floppy disk drive unit (FDD), and prints it out through a printer as needed. The measurement data stored in the external storage unit is collectively supplied to a data processing unit such as a host computer installed in a different room.

The distance between the installation place of the data input unit and the application place of each measuring unit and answer back unit is determined by the output value of a transmitter incorporated in the measuring unit. It is found that the maximum distance is about 10 m.

A data input unit must be arranged in such a measuring system for the following reasons. Each measuring unit is used in a place near a manufacturing site. In consideration of high-frequency noise and the like, it is not proper to install a data processing unit such as a host computer in such an environment. If a large amount of measurement data upon successive measurement is to be stored in each measuring unit itself, an additional electronic device such as a storage device must be incorporated in the measuring unit. As a result, each measuring unit is increased in size, and its operability decreases. For these reasons, measurement data obtained by each measuring unit is temporarily accumulated in a data input unit arranged near a measurement site, and is supplied to a data processing unit installed in a management room through leads or a storage media of an external storage unit.

As described above, it is difficult to incorporate a receiver (answer back unit) for receiving the ACK signal in a measuring unit, because the size of the measuring unit itself is undesirably increased. In addition, the following problem is left unsolved. If a receiver for receiving the ACK signal is incorporated in each measuring unit, the manufacturing cost of the overall measuring system is increased. Furthermore, an operator cannot directly confirm, by only the form that the normal response is represented by the illumination of a display lamp or buzzer sound representing "correct" or "incorrect", that the transmitted measurement data is correct measurement data obtained by actual measurement.

In addition, in a manufacturing site in a factory, an operator may be required to carry a measuring unit about in the manufacturing site and measure a physical value in each manufacturing step of a product, instead of performing measurement at a predetermined position of a product inspection line or the like. In such a case, the distance from the measuring unit and the answer back unit to a data input unit often exceeds a distance limit of 10 m. In this case, therefore, measurement data cannot be collected in the data input unit by radio transmission.

In some cases, measurement is performed by using a simple measuring unit without a circuit for converting a measurement value into an electrical signal. In such a case, an analog measurement value obtained with the naked eye is temporarily recorded on a notebook or the like. Thereafter, the recorded measurement value must be directly input in a data processing unit through a keyboard.

SUMMARY OF THE INVENTION

The present invention has been made in consideration of the above situation, and has as its object to provide a portable data transmitting/receiving apparatus which allows an operator to perform measurement (inspection) while confirming measurement data, and which can be carried by the operator, together with a measuring unit to perform measurement, thereby greatly increasing the reliability of measurement data to be input, as well as measurement operation efficiency.

According to the present invention, there is provided a portable data transmitting/receiving apparatus comprising a receiver for receiving measurement data value output as a radio wave from a measuring unit for measuring a physical or chemical value of an object to be measured together with a data type for identifying the measuring unit, a keyboard for inputting data types, units, and measurement data values, the keyboard including a transmission key for designating data transmission and a cancel key for designating data clearing, a display unit for displaying a measurement data value input through the receiver and/or the keyboard, a memory for storing measurement data values sequentially input through the receiver and/or the keyboard together with the data types and the units, clear means for clearing a data type, a unit, and a measurement data value stored last in the memory, upon operation of the cancel key, and data transmitting means for transmitting all measurement data values stored in the memory to an external data processing unit together with the data types and the units by radio transmission, upon operation of the transmission key.

DETAILED DESCRIPTION OF THE PREFERRED EMBODIMENT

An embodiment of the present invention will be described below with reference to the accompanying drawings.

Figure 1:
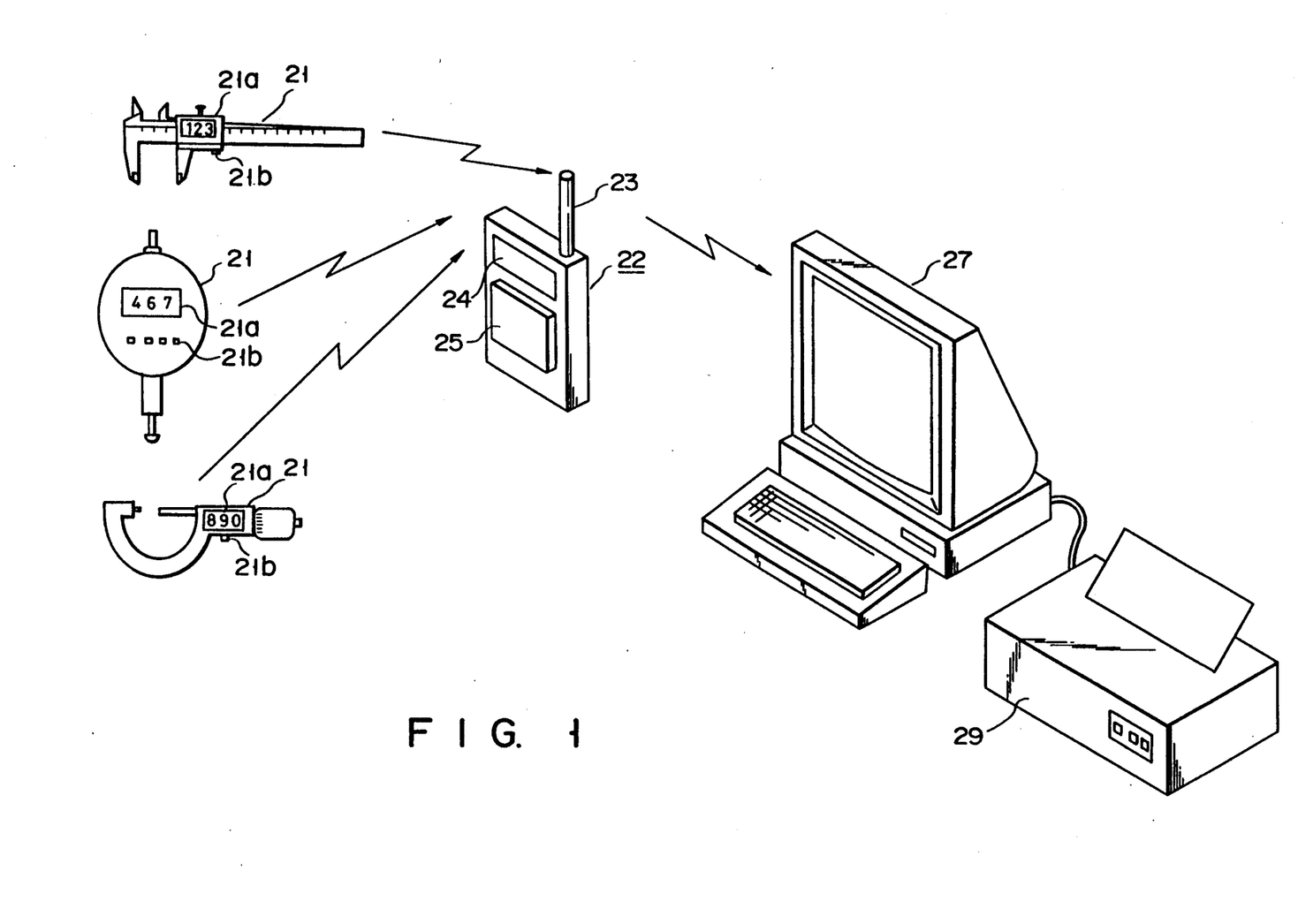
FIG. 1 is a view illustrating an overall arrangement of a measuring system to which a portable data transmitting/receiving apparatus, according to an embodiment of the present invention, is applied.

FIG. 1 shows an overall measuring system incorporating a portable data transmitting/receiving apparatus of the embodiment. As shown in FIG. 1, measurement data which is output as radio waves from small measuring units 21 such as a vernier caliper, a dial gauge, and a micrometer each of which incorporates a transmitter are input in a portable data transmitting/receiving apparatus 22 through its antenna 23. A display unit 24 for displaying measurement data, a keyboard 25 for input measurement data, and the like are arranged on the front surface of a casing of the apparatus 22.

The portable data transmitting/receiving apparatus 22 transmits measurement data to an external data processing unit 27 constituted by a host computer through its antenna 23. Upon reception of this measurement data, the data processing unit 27 performs various data processing with respect to the measurement data, and prints out the processing result through a printer 29.

Each measuring unit 21 incorporates a circuit for extracting a measurement value as an electrical signal and a very small transmitter for outputting measurement data including a data value extracted by the circuit and a data type (ID data) by radio transmission. When an operator depresses a transmission button 21b upon confirmation of a data value displayed on a display portion 21a, digital measurement data including a data type (ID data) assigned to each measuring unit 21 itself and a data value is incorporated in a serial transmission frame and is FSK-modulated (direct frequency modulation) to be transmitted through the transmitter as a radio wave.

Figure 2:
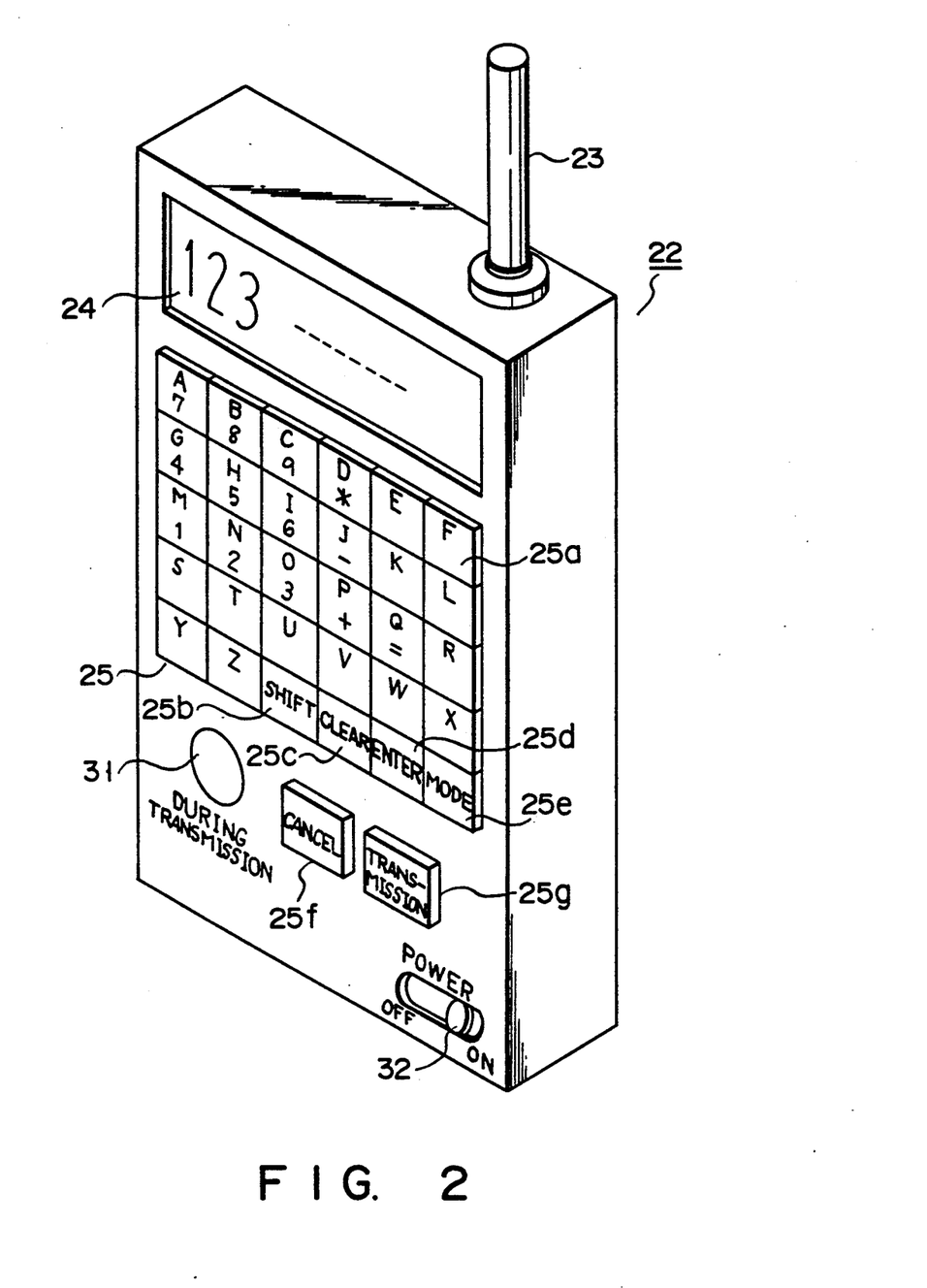
FIG. 2 is a perspective view showing an outer appearance of the portable data transmitting/receiving apparatus according to the embodiment of the present invention.

FIG. 2 shows an outer appearance of the portable data transmitting/receiving apparatus in detail. Several to twenty alphanumeric characters can be displayed on the display unit 24 constituted by a liquid crystal display board. The keyboard 25 comprises a plurality of data keys 25a, a shift key 25b, a clear key 25c, an enter key 25d, and a mode key 25e. Each data key 25a can be shifted from a numeral key to a letter key upon operation of the shift key 25b. The enter key 25d is operated to indicate that an input operation of a data value is completed. The mode key 25e is used to switch an input mode of measurement data to a reception mode for receiving data through a receiver or to a key input mode for input data through the keyboard 25. The keyboard 25 further comprises a data cancel key 25f, which is used for each item, and a transmission key 25g.

In addition, a transmission lamp 31 for displaying that measurement data accumulated in the portable data transmitting/receiving apparatus 22 is being transmitted to the data processing unit 27 is arranged on the front surface of the casing together with a power source switch 32.

Figure 3:
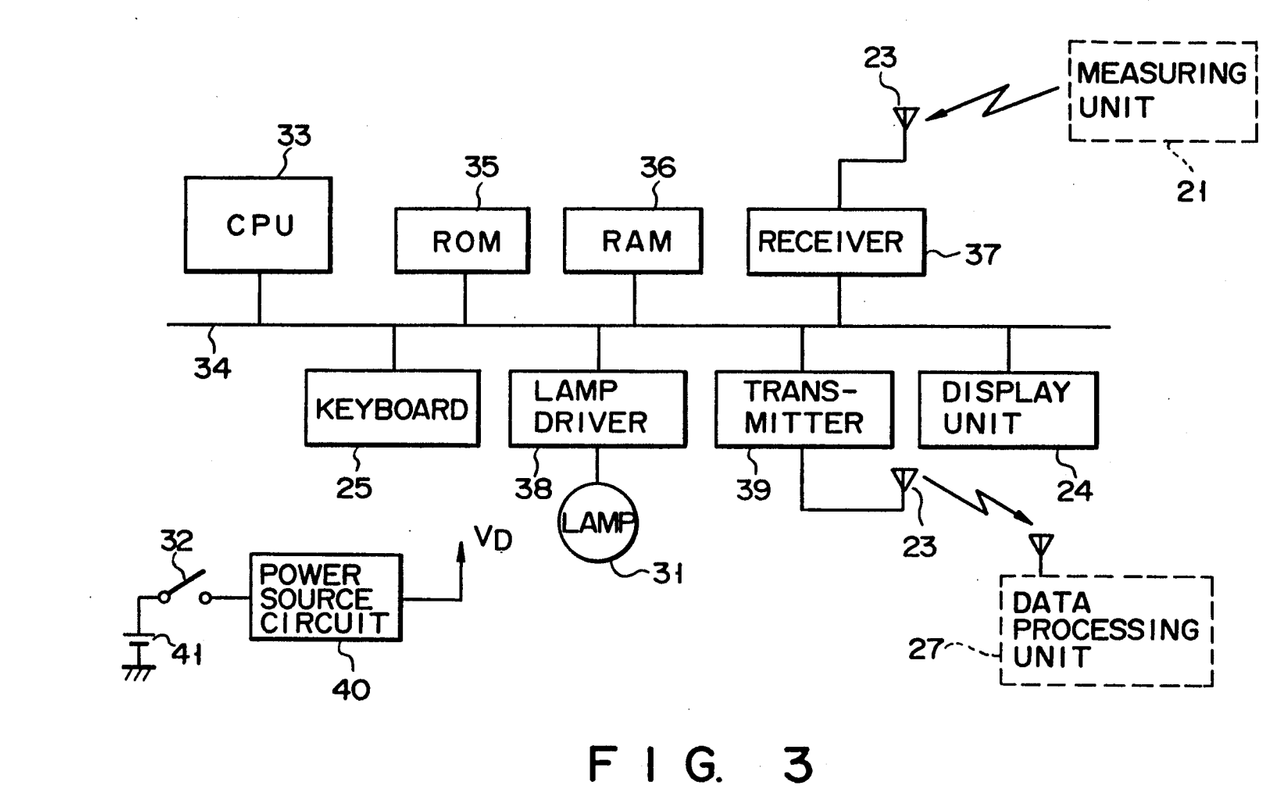
FIG. 3 is a block diagram of the portable data transmitting/receiving apparatus in FIG. 2.

FIG. 3 is a block diagram showing a schematic arrangement of the above-described portable data transmitting/receiving apparatus 22. A ROM 35, a RAM 36, a receiver 37, a lamp driver 38, a transmitter 39, the display unit 24, the keyboard 25, and the like are connected through a bus line 34 to a CPU (central processing unit) 33 for executing various operations. The ROM 35 stores control programs to be executed by the CPU 33. The RAM 36 temporarily stores variable data such as input measurement data. The receiver 37 receives measurement data output from each measuring unit 21 by radio transmission through the antenna 23. The lamp driver 38 drives the transmission lamp 31. The transmitter 39 transmits measurement data stored in the RAM 36 to the data processing unit 27 through the antenna 23. Although FIG. 3 shows the two antennas 23, they can be designed as a single antenna 23.

A DC driving voltage $V_D$ is applied from a power source circuit 40 to each electronic component described above. Power is supplied from a battery 41 including NiCd to the power source circuit 40 through the power source switch 32.

Figure 4:
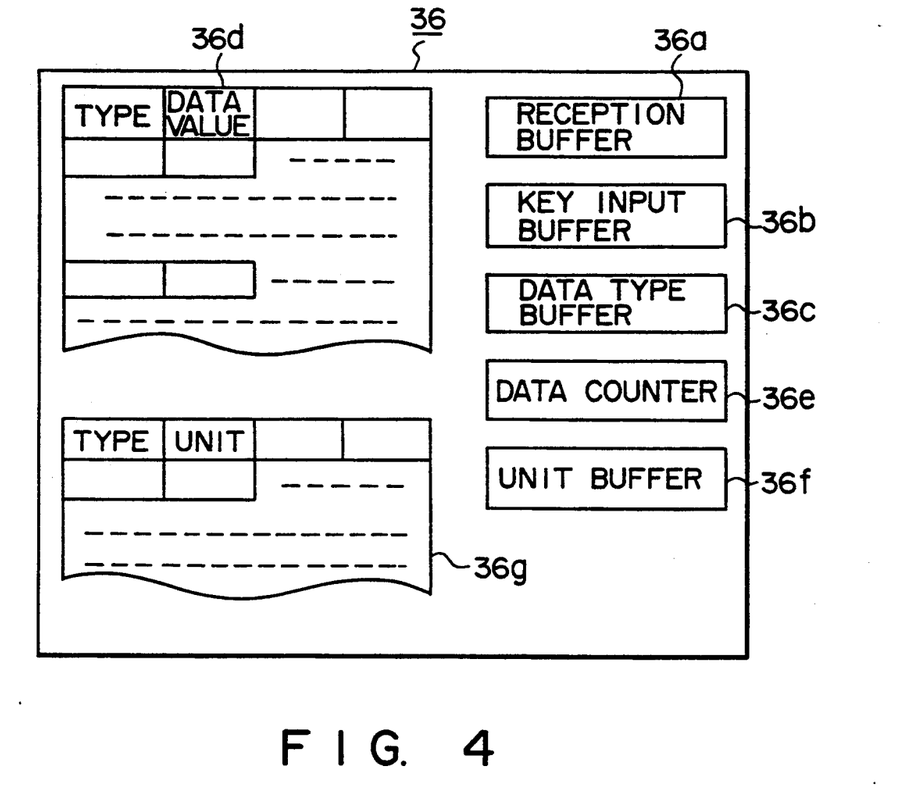
FIG. 4 is a view showing a data storage structure of a RAM in FIG. 3.

As shown in FIG. 4, the RAM 36 incorporates a reception buffer 36a, a key input buffer 36b, a data type buffer 36c, a data memory 36d, a data counter 36e, a unit buffer 36f, a unit table memory 36g, and the like. The reception buffer 36a temporarily stores measurement data which is output from the measuring unit 21 and received by the transmitter 37. The key input buffer 36b temporarily stores data input through the keyboard 25. The data type buffer 36c stores a data type input through the data keys 25a of the keyboard 25 until the next data type is input. The data memory 36d stores measurement data input through the receiver 37 and the keyboard 25 in the input order. The data counter 36e counts the count of measurement data stored in the data memory 36d. The unit buffer 36f stores a unit (e.g., MM or KG) input through the data keys 25a of the keyboard 25 until the next unit is input. The unit table memory 36g sequentially stores data types and corresponding units which are set by the data keys 25a of the keyboard at the start of operation of the apparatus and respectively stored in the data type buffer 36c and the unit buffer 36f.

Figure 5:
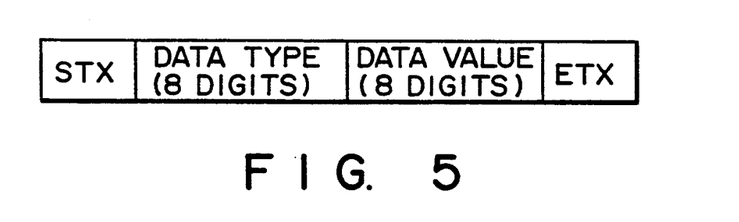
FIG. 5 shows a transmission frame of measurement data to be received; data to be received.
Figure 6A:
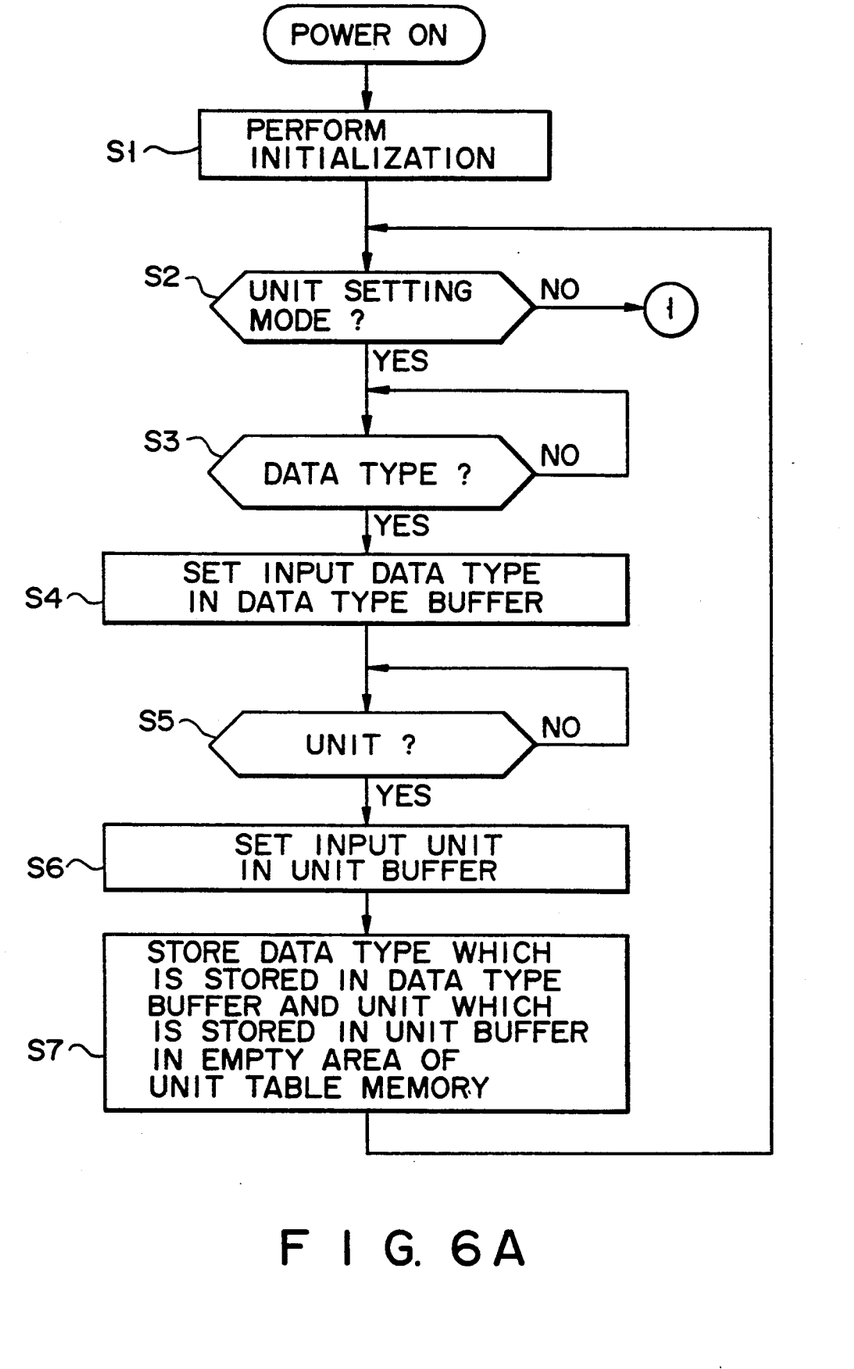
FIGS. 6A to 6D are flow charts for explaining an operation of the portable data transmitting/receiving apparatus in FIG. 2.
Figure 6B:
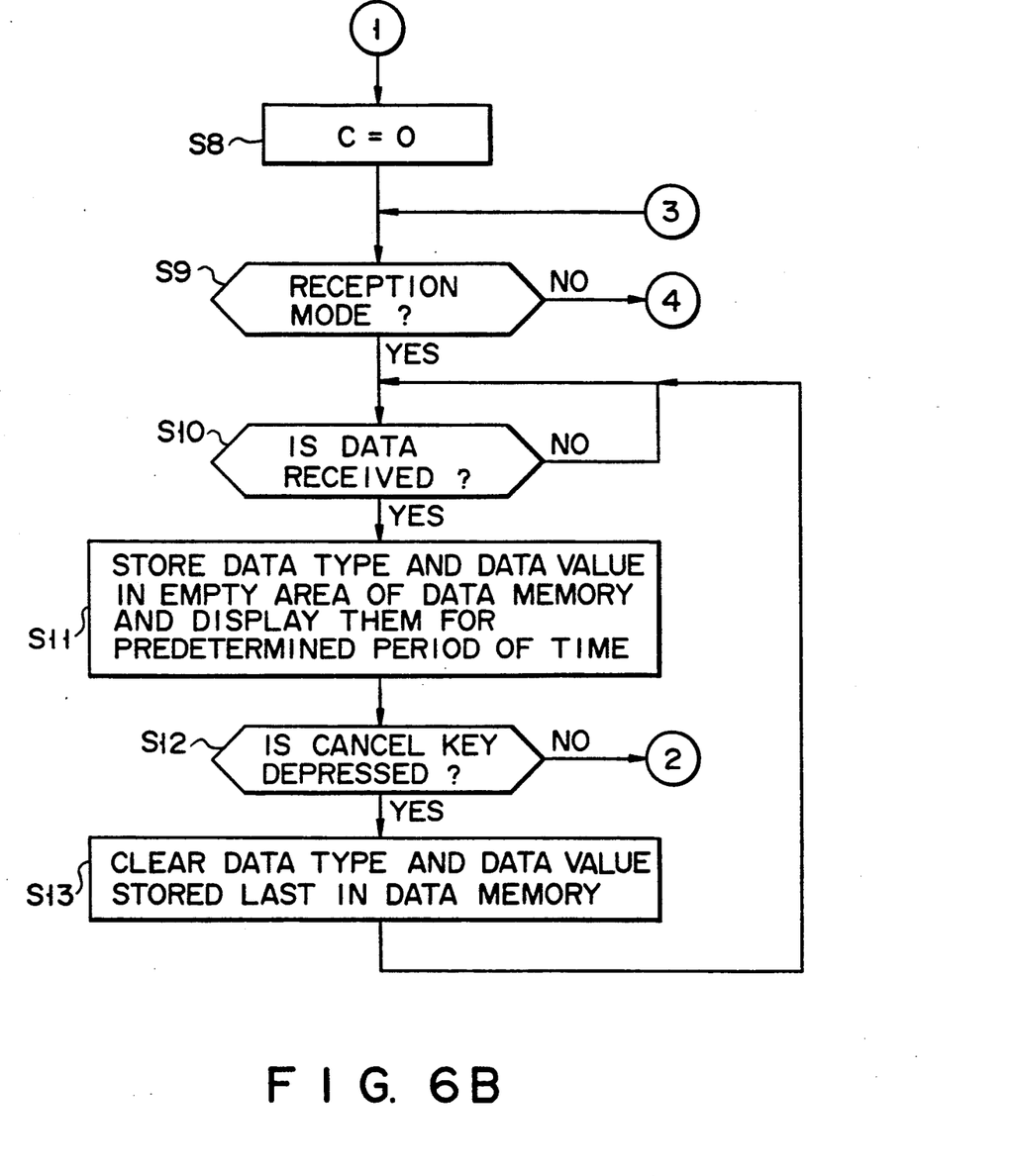
Figure 6C:
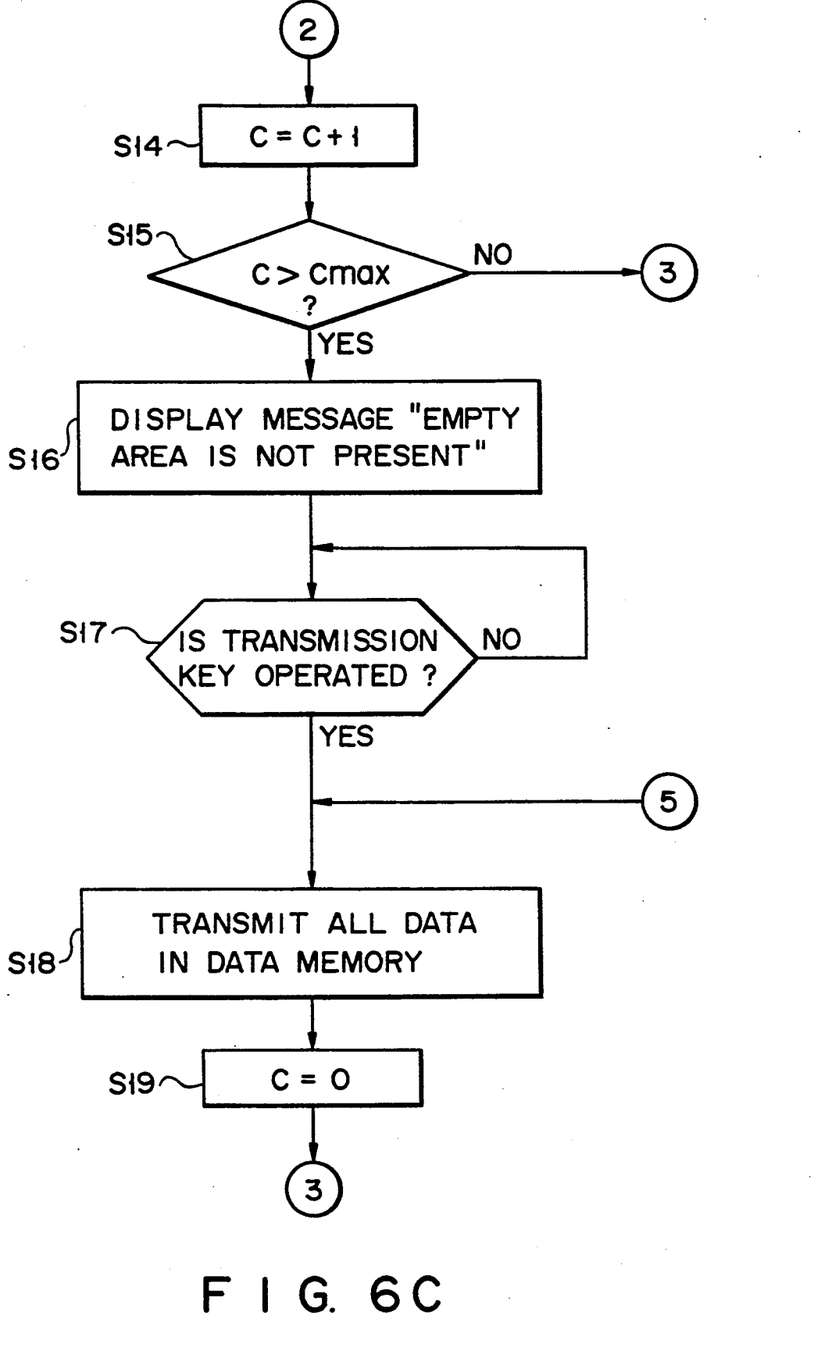
Figure 6D:
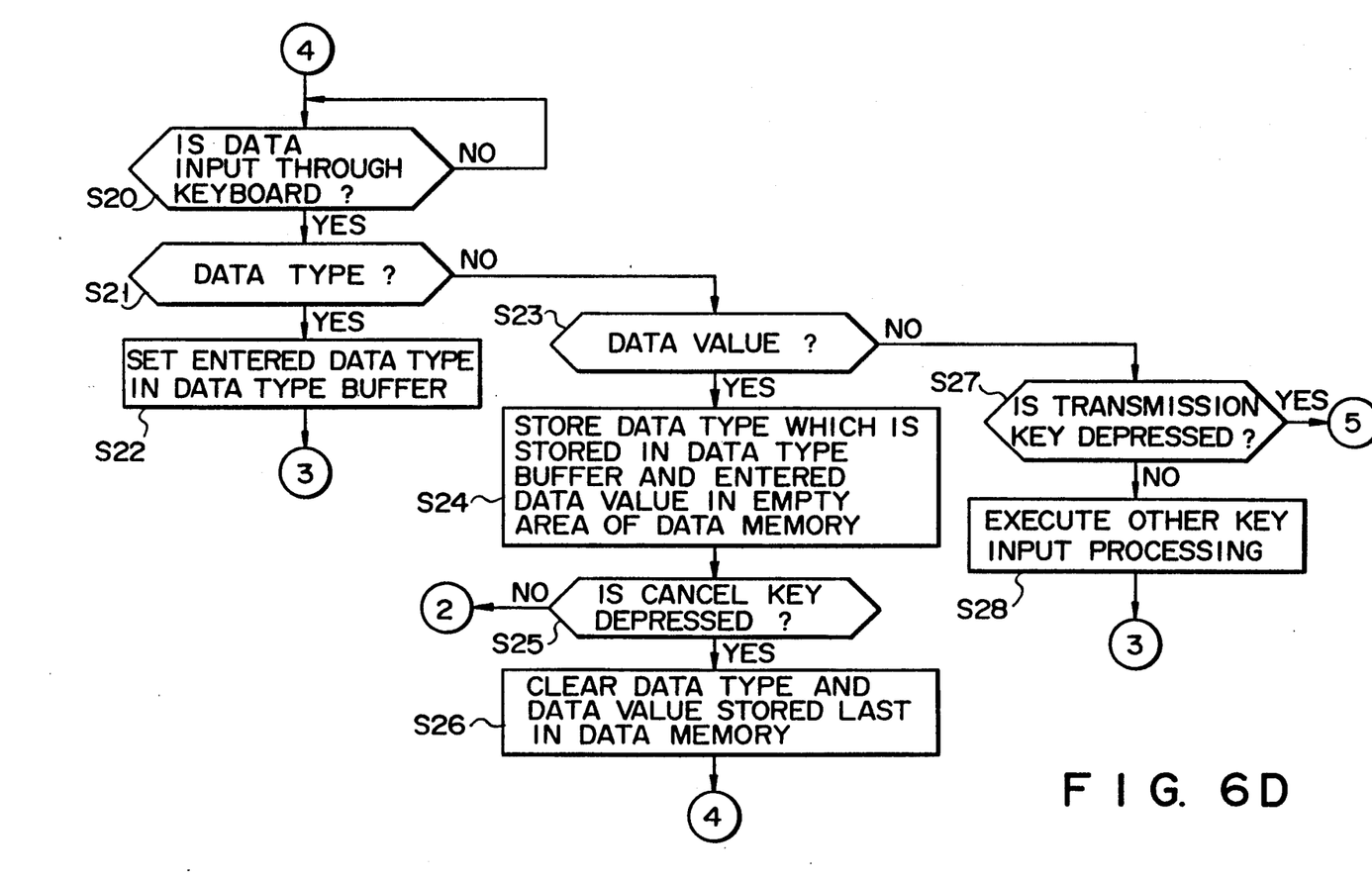

As shown in FIG. 5, one piece of measurement data output from each measuring unit 21 by radio transmission is constituted by a data type, including alphanumeric characters of eight digits, for representing a measurement item of an object to be measured which is assigned to the measurement unit 21 in advance, and a data value of eight digits representing a measurement value itself, i.e., data having 16 digits in total. When the measurement data is to be transmitted, a start code (STX) and an end code (ETX) are respectively appended to the start and end of the measurement data.

When the power source switch 32 of the portable data transmitting/receiving apparatus 22 is turned on, the CPU 33 executes an operation based on the flow charts shown in FIGS. 6A to 6D in accordance with a control program stored in the ROM 35.

More specifically, when the power source switch 32 is turned on, the RAM 36, the display unit 24, and the like are initialized (step S1). A unit setting mode is then set. In the unit setting mode (step S2), when a data type constituted by a combination of a plurality of alphanumeric characters is input through the data keys 25a of the keyboard 25 (step S3), the data type is stored in the data type buffer 36c (step S4). When a unit, e.g., MM or KG, is input through the data keys 25a (step S5), the unit is stored in the unit buffer 36f (step S6). Subsequently, the data type stored in the data type buffer 36c is combined with the unit stored in the unit buffer 36f, and the combined data is stored in an empty area of the unit table memory 36g (step S7).

When units are set with respect to a plurality of data types in this manner, the mode key 25e of the keyboard 25 is operated to complete the unit setting mode.

When the unit setting mode is completed (step S2), data count C of the data counter 36e of the RAM 36 is cleared to be zero (step S8). The input mode of the portable data transmitting/receiving apparatus 22 is checked from the state of the mode key 25e of the keyboard 25. If the reception mode is set (step S9), the flow is halted until measurement data including a data type and a data value is supplied from the measuring unit 21 to the reception buffer 36a through the receiver 37 (step S10). When the measurement data is received, the start and end codes are removed from the data, and the data type and the data value are displayed on the display unit 24 for a predetermined period of time, e.g., one second. At the same time, this data is stored in an empty area of the data memory 36d of the RAM 36 (step S11). At this time, if the cancel key 25f of the keyboard 25 is operated (step S12), the data type and the data value stored last in the data memory 36d are cleared (step S13) so as to wait for new data reception. Therefore, if the operator determines from the display in step S11 that the data is not properly received, the data can be cleared.

If the cancel key 25f is not operated (step S12), the data count C of the data counter 36e is incremented by one (step S14). Subsequently, it is checked whether the data count C upon this increment exceeds a maximum value $C_{max}$ determined by the storage capacity of the RAM 36 (step S15). If NO is obtained in this step, the flow returns to step S9 described above to confirm that the input mode is set to the reception mode and waits for the next measurement data reception from the measuring unit 21.

Figure 7:
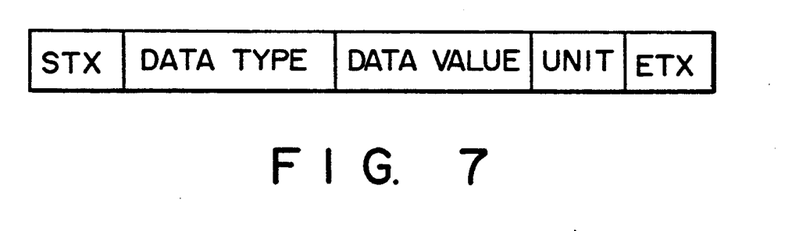
FIG. 7 shows a transmission frame of measurement data to be transmitted.

If YES is obtained in step S15, a message indicating that no empty area is present is displayed on the display unit 24 (step S16). If the transmission key 25g of the keyboard 25 is operated after this step all the measurement data stored in the data memory 36d is transmitted to the data processing unit 27 through the transmitter 39 and the antenna 23 (step S18). In this case, each measurement data is constituted by a unit stored in the unit table memory 36g in addition to a data type and a data value, as shown in FIG. 7. When transmission of all the measurement data is completed, the data count C of the data counter 36e is cleared to be zero (step S19), and the transmission lamp 31 is turned off. Thereafter, the flow returns to step S9 again to check an input mode.

If NO is obtained in step S9, the key input mode for inputting data through the keyboard 25 is determined, and operation of the data keys 25a of the keyboard 25 is halted (step S20). When a data type constituted by a combination of a plurality of alphanumeric characters is input through the data keys 25a (step S21), the data type is stored in the data type buffer 36c (step S22). The flow then returns to step S9.

When a data value constituted by a combination of numerals is input from the data keys 25a (step S23), one piece of measurement data is constituted by combining the data type stored in the data type buffer 36c with the currently input data value, and is stored in an empty area of the data memory 36d (step S24). At the same time, the data type and the data value are displayed on the display unit 24. Thereafter, the operator determines from the display of the display unit 24 whether the data is correct. If the data is not correct, the operator operates the cancel key 25f. If the cancel key 25f is operated (step S25), the data type and the data value stored last in the data memory 36d are cleared (step S26), and the flow returns to step S20 to wait for input of new data through the keyboard 25. If the cancel key 25f is not operated (step S25), the flow returns to step S14 to increment the data count C of the counter 36e by one.

In addition, when a key signal of the transmission key 25g is input (step S27), even if the data count C of the data memory 36d does not exceed the maximum value $C_{max}$, the flow returns to step S18 to transmit all the measurement data of the data memory 36d to the data processing unit 27.

Note that when a key signal other than the one described above is input (step S27), processing corresponding to the input key signal is executed (step S28).

The operator places the portable data transmitting/receiving apparatus 22 having the above-described arrangement near the measuring unit 21 and measures a physical value, e.g., a length, of an object to be measured by using the measuring unit 21. When the transmission button 21b is depressed after one measuring operation is completed and the data value is confirmed through the display portion 21a of the measuring unit 21, measurement data including a data type and the data value is output as a radio wave and is supplied to the portable data transmitting/receiving apparatus 22. Subsequently, the measurement data is displayed on the display unit 24 of the portable data transmitting/receiving apparatus 22, and at the same time, is stored in the data memory 36d.

As described above, the operator can proceed with a measuring operation while confirming that a data value measured by the measuring unit 21 is properly input in the portable data transmitting/receiving apparatus 22. Therefore, errors due to data transmission errors and the like included in a data processing result can be minimized. Hence, reliability of measurement data can be increased. As is apparent from the above description, a receiver (answer back unit) for receiving a normal response signal in the conventional measuring system can be omitted.

When measurement data obtained by respective measuring units 21 are sequentially supplied to the portable data transmitting/receiving apparatus 22, and a series of measuring operations is completed, or when the data memory 36d is filled with data, the apparatus 22 is carried to the data processing unit 27 installed in the management room. When the transmission key 25g is operated, all the measurement data accumulated in the data memory 36d is collectively supplied to the data processing unit 27.

Since the portable data transmitting/receiving apparatus 22 can be moved to an arbitrary place together with the measuring units 21, the operator can perform measurement of each product in each step while carrying the measuring unit 21 and the apparatus 22 and moving about in a manufacturing site. Thus, the operability can be greatly improved compared with the conventional apparatus.

In addition, since measurement data can be keyinput through the keyboard 25, even if a simple measuring unit without a circuit for converting a measurement value into an electrical signal is used, a measurement value can be directly input through the keyboard 25 without recording it in a notebook. Therefore, the procedure for inputting a data value in the data processing unit 27 can be simplified, and the measurement operation efficiency can be further increased.

Moreover, since all the measurement data can be transmitted to the data processing unit 27 by radio transmission, cables or the like need not be connected to the portable data transmitting/receiving apparatus 22 and the operability can be further improved.

As has been described above, according to the portable data transmitting/receiving apparatus of the present invention, measurement data including a data type and a data value transmitted from each measuring unit 21 by radio transmission is received by the receiver 37 so as to be displayed on the display unit 24 and stored in the data memory 36d. At this time, it is determined from the display of the display unit 24 whether the received measurement data is correct. If the data is not correct, the data stored in the data memory 36d can be cleared. Similarly, measurement data input through the keyboard 25 is stored in the data memory 36d. Upon completion of the measuring operation, the portable data transmitting/receiving apparatus 22 is carried to the installation place of the external data processing unit 27. When the transmission key 25g is operated, all the measurement data accumulated in the data memory 36d can be input in the data processing unit 27 by radio transmission. Since the operator can perform measurement (inspection) while confirming physical or chemical measurement data, and the apparatus can be easily carried together with each measuring unit, the operator can carry out measurements while moving.

According to the present invention, in addition to the great increases in reliability of input measurement data and measurement operation efficiency, since an answer back unit employed in the conventional system can be omitted, the allowable distance between a data input unit and a measuring unit or a receiver can be increased.

What is claimed is:

1. In a measurement data collecting system including a plurality of measuring units for measuring physical or chemical values of an object and wirelessly outputting measurement data values based on the measurement results, together with data types for discriminating the measuring units, a data processing unit for receiving said measurement data values and collecting said data values based on said data types, and a portable data transmitting/receiving apparatus used in combination with said data processing unit and said plurality of measuring units, said portable data transmitting/receiving apparatus comprising:

a keyboard arranged on the front of said portable data transmitting/receiving apparatus operable in a first mode for inputting data types, units and measurement data values, said keyboard including a transmission key for designating data transmission and a cancel key for designating data clearing;

a display unit arranged on the front of said portable data transmitting/receiving apparatus operable in said first mode for displaying measurement data values input through said keyboard;

a memory operable in said first mode for storing measurement data values sequentially input through said keyboard together with said data types and units;

said portable data transmitting/receiving apparatus further including a receiver operable in a second mode for receiving input measurement data values and units wirelessly output from one of said plurality of measuring units together with said data types and for storing said data values, units and types in said memory;

a transmitter for wirelessly transmitting all stored measurement data values to said data processing unit together with said data types and units; and control means responsive to the operation of said cancel key for clearing the data type, unit and measurement data value which was last stored in said memory in said first or second modes;

said control means being responsive in said second mode to said receiver for controlling said display unit to display said received input measurement data values and data types so that an operator can determine the correctness of measurement data values input through said receiver;

said control means being responsive to the operation of said transmission key for operating said transmitter to wirelessly transmit all of said measurement data values to said data processing unit together with said data types and units, whereby an operator can determine whether the measurement data, unit and type data displayed in said second mode coincides with the measurement data, unit and data type of said one measurement unit, clear said measurement data, unit and data type from memory if it does not coincide, and in said first mode enter correct measurement data, unit and data type via said keyboard.

2. The portable data transmitting/receiving apparatus according to claim 1, wherein said control means includes means for storing into said memory said data types and said units corresponding to said data types when both are input from said keyboard prior to the transmission or the input of measurement data values by said receiver and/or keyboard.

3. The portable data transmitting/receiving apparatus according to claim 2, wherein said memory includes data memory for storing said data types and measurement data values received by said receiver, and unit memory for storing said data types and units input by said keyboard.

4. The portable data transmitting/receiving apparatus according to claim 3, wherein said control means includes means for clearing data type and unit lastly stored in said unit memory, responsive to the operation of said cancel key when said data type and unit are stored in said unit memory.

5. The portable data transmitting/receiving apparatus according to claim 3, wherein said control means includes means for clearing data type and measurement data value lastly stored in said data memory, responsive to the operation of said clear key when measurement data value received by said receiver is stored in said data memory and displayed on said display unit.

6. A portable data transmitting/receiving apparatus according to claim 3, wherein said control means includes means for causing said display unit to indicate when said data memory is filled.

* * * * *